Jan. 29, 1957  W. HAMILTON  2,779,207
MULTIPLE NUT ASSEMBLY WITH LOAD EQUALIZER
Filed Jan. 23, 1956  2 Sheets-Sheet 1

*INVENTOR.*
WALLACE HAMILTON
BY
*ATTORNEY*

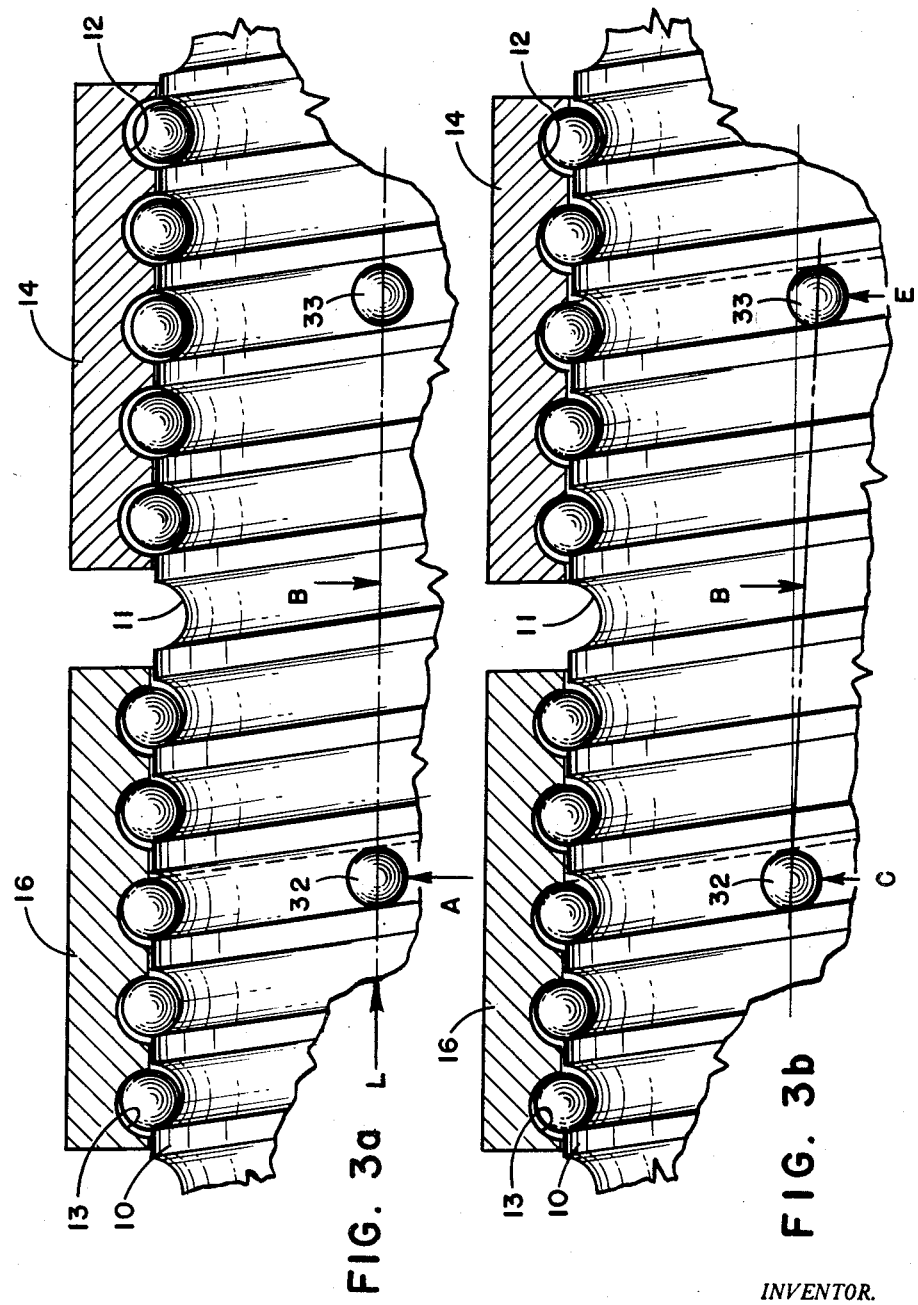

United States Patent Office 2,779,207
Patented Jan. 29, 1957

2,779,207

MULTIPLE NUT ASSEMBLY WITH LOAD EQUALIZER

Wallace Hamilton, Chagrin Falls, Ohio, assignor to The Cleveland Pneumatic Tool Company, Cleveland, Ohio, a corporation of Ohio Application January 23, 1956, Serial No. 560,551

10 Claims. (Cl. 74—459)

This invention relates to screw and nut devices and more particularly to a screw and nut assembly providing a plurality of nuts threadedly connected to a single screw incorporating means to equally divide the load between the nuts.

It is an important object of this invention to provide a screw and nut assembly incorporating a plurality of nuts wherein means are provided to compensate for lead errors in various elements.

It is another important object of this invention to provide an antifriction screw and nut assembly incorporating a plurality of nuts which cooperate with a single screw in combination with means to insure that each of the nuts supports the proper proportion of the attached load.

It is still another object of this invention to provide an antifriction screw and nut assembly incorporating a plurality of nuts cooperating with a single screw wherein the assembly operates efficiently at all times and is not subject to increased frictional losses created by slight imperfections in the geometry of the elements.

It is still another object of this invention to provide a screw and nut assembly incorporating a plurality of nuts which cooperate with a single screw including means to divide the attached load between all of the nuts so that short nuts may be used in series carrying substantially any desired load.

Further objects and advantages will appear from the following description and drawings, wherein:

Figures 3a and 3b are schematic illustrations of the operation of a screw and nut assembly; and, Figure 4 is a schematic illustration showing how more than two nuts may be used when the connected load is greater than the capacity of two nuts.

In actual practice difficulty is encountered in the use of antifriction ball screw and nut assemblies if a large number of turns of balls are utilized. If the screws, nuts and antifriction ball bearings could be manufactured so that the surfaces were mathematically perfect, each of the balls would roll along the grooves of the nut and the screw with exactly the same velocity and there would be no tendency for one ball to overtake another and create frictional engagement therebetween. Therefore, in theory, extremely high efficiencies can be achieved regardless of the length of the nut. In practice, however, extremely small variations in the geometry of the various elements cause some of the balls to tend to roll along the grooves of the nut and screw with different velocity than other balls. This causes adjacent balls to engage and create large pressure therebetween with attendent frictional losses. The frictional losses due to this engagement between adjacent balls tends to build up as the balls move along the grooves of the nut and screw from one end of the nut to the other. Therefore, it is desirable to utilize nuts which have in the order of one and one-half to two and one-half turns of balls so that the pressure between adjacent balls will be relieved as the balls enter the return tube before the pressures build up to excessive values. However, if short nuts are utilized there is a limitation of the load carrying capacity because the load on an individual ball times the number of balls carrying the load determines the allowable load on the nut. If the nut has a small number of turns it follows that there is a limited number of balls carrying the load and therefore a limited load can be applied to the nut. By utilizing a nut assembly incorporating a plurality of nuts as taught by this invention, it is possible to use more than one short nut in series so that essentially any desired load may be carried.

Lead errors also cause difficulty when long nuts are utilized, since the effect of lead errors increases as a function of the length of the nut. In some extreme cases it is found that balls at opposite ends of a long nut are oppositely loaded or that a very small percentage of the balls are available for carrying the load. Here again a short nut tends to eliminate this difficulty since the effect of lead error tends to decrease as the nuts are shortened. It is therefore possible to produce a much more efficient mechanism if a series of short nuts are used if means are provided to insure that all of the nuts carry their share of the load.

Figure 1:
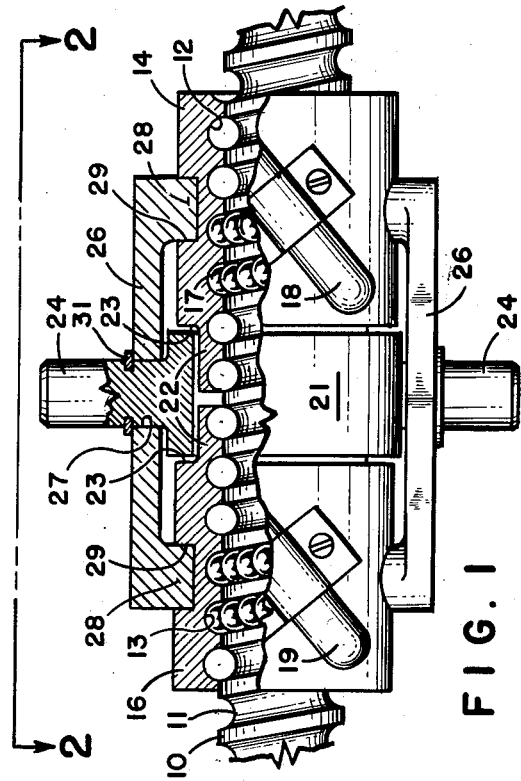
Figure 1 is a side elevation partially in longitudinal section showing an antifriction screw and nut assembly according to this invention which incorporates two individual nuts cooperating with a single screw and a preferred connection mechanism which equally divides the load between the two nuts.

Figure 1 shows an antifriction screw and nut assembly according to this invention wherein a screw element 10 is formed with a helical groove 11 which cooperates with helical grooves 12 and 13 formed in nut members 14 and 16 respectively to define helical passages filled with antifriction balls 17. Each of the nut members 14 and 16 is provided with a return tube 18 and 19 respectively which connect the ends of the corresponding helical passage to form a closed circuit for the antifriction members within each of the nuts. The proportions of the nut should be arranged so that the nuts are short and contain a small number of turns which in the illustrated case is two and one-half turns per nut. Because the nuts are short, the pressure between adjacent balls is relieved before it becomes excessive and the efficiency remains high as the nuts are threaded along the screw.

In order to provide a connection between the two nuts so that they will each carry an equal share of the load, I provide an annular load carrier 21 which fits around adjacent skirt portions 22 formed on the ends of the nuts 14 and 16. Axial clearance is provided between the radial walls 23 on the nuts 14 and 16 and the load carrier 21 to permit a limited amount of relative axial motion therebetween and the skirts 22 provide radially positioning of the load carrier. The load carrier 21 is formed with trunnions 24 for the connection of the load to be supported by the nut assembly. A pair of yokes 26 are each formed with a bore 27 through which one of the trunnions 24 projects and opposite ends are formed with inwardly projecting portions 28 which fit into bores 29 formed on the outer surface of each of the nuts. A snap ring 31 securely holds the yokes 26 in the assembled position. Therefore, the two yokes are pivotally connected to the load carrier 21 at their center and to the two nuts at opposite ends.

Those skilled in the art will recognize that this connection between the two nuts through the yokes 26 and load carrier 21 permits a limited amount of relative rotation between the nuts. Reference should now be made to Figures 3a and 3b for a clear understanding of the operation of the assembly. It should be understood that these figures illustrate only a schematic equivalent of the preferred screw and nut assembly. Referring to Figure 3a, assuming that an axial load "L" is applied to the screw 10 and a rotational force "B" tends to rotate the nuts in a clockwise direction viewed from the left side of the figure. If there is a lead error between the nut and screw elements so that the left nut 16 is carrying all of the load "L" as shown in Figure 3a, the balls of the right nut 14 are not in contact with the groove 12 of the nut 14. When this condition arises, the load "B" will be opposed only by a force "A" on balls 32 in the nut 16 and will result in a turning moment which tends to rotate the yoke about its pivotal connection with the left nut 16 and causes the right nut 14 to rotate in a clockwise direction relative to the left nut 16. This will continue until the elements assume the position in Figure 3b at which time the balls 32 within the left nut 16 are still in contact with the groove 11 on the screw 10 and the groove 13 in the nut 16. However, the relative rotation between the nut 14 and the nut 16 has caused the ball 33 in the nut 14 to be loaded and in engagement with the groove 11 on the screw 10 and the groove 12 in the nut 14. At this time the force "B" applied to the yoke is resisted by the load on the balls 32 and 33 with equal forces "C" and "E." Relative rotation between the two nuts therefore stops and the two nuts will each carry one half of the load applied to the load carrier. In other words, the yokes 26 cause relative rotation between the load carrier 21 and one of the nuts in one direction and between the load carrier and the other of the nuts in the other direction until the load is equally divided between the nuts. If variations occur in the lead along the length of the screw which tend to load the two nuts unequally, there will automatically be a limited amount of relative rotation between the two nuts which continues until the load on the two nuts is equally divided. This is true whether the screw is rotating and the nuts are fixed or vise versa.

Figure 2:
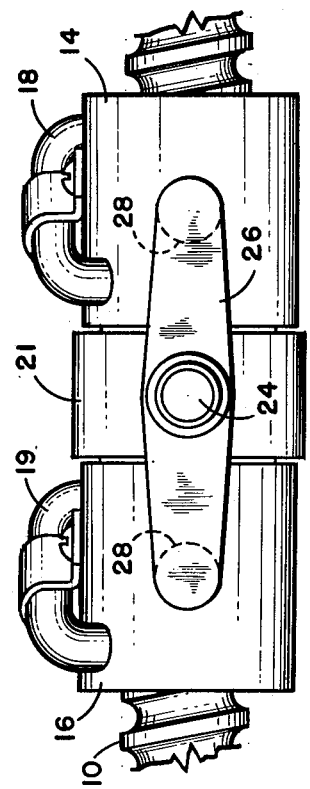
Figure 2 is a view taken along 2—2 of Figure 1.
Figure 4:
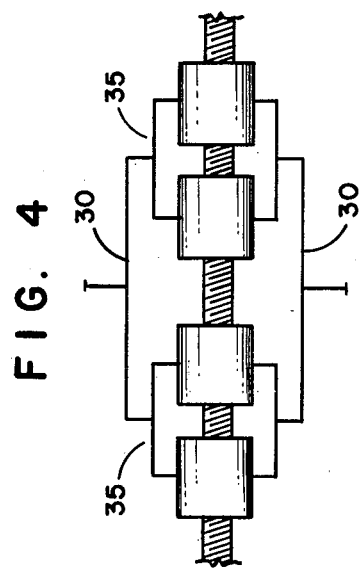

The inwardly projecting portions 28 on each of the yokes 26 are equally spaced from the connection between each yoke and the trunnions 24 so the load is equally divided between the nuts. By utilizing this structure those skilled in the art will recognize that it is possible to utilize short nuts which operate efficiently at all times and will provide essentially any desired load carrying capacity since more nuts can be used if higher loads are carried. Figure 4 shows how four nuts could be connected by utilizing a yoke assembly between two sub-units similar to that shown in Figures 1 through 3 in combination with a yoke connection 30 between the two sub-units 35 to equally divide the load therebetween.

Additional savings are achieved by the use of this invention since standard short nuts can be manufactured in large quantities and connected in assemblies with the required number of nuts to carry any given load. Since all of the nuts will carry an equal load, and since errors in the geometry of the various elements are automatically compensated for, a highly efficient assembly results.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described a screw element, a plurality of nut members threaded on said screw element whereby relative rotation between said members and element produces relative axial motion therebetween, a load carrier adapted to be connected to a load, and means connected between said carrier and said members dividing the load applied to said carrier between said members in a predetermined manner regardless of the magnitude of the load.

2. In a device of the character described a screw formed with a helical groove, a pair of nuts each formed with a helical groove which cooperates with said screw groove to define a helical passage within each nut, antifriction elements in each passage interconnecting each nut and said screw whereby relative rotation therebetween produces relative axial motion, a load carrier adapted to be connected to a load, and means connected between said nuts and load carrier adapted to divide the load on said load carrier equally between said nuts, said means producing relative rotation between said load carrier and one of said nuts in one direction and between said load carrier and other nut in the other direction when the load on said load carrier is unequally divided between said nuts.

3. In a device of the character described a screw element, a pair of nut members threaded on said screw element whereby relative rotation between said members and element produces relative axial motion therebetween, a load carrier adapted to be connected to a load, yoke elements symmetrically spaced around said nut members pivotally connected to said load carrier, each yoke element being pivotally connected to both of said nut members whereby the forces created by said load are transmitted to said nuts.

4. In a device of the character described a screw element, a pair of nut members threaded on said screw element whereby relative rotation between said members and element produces relative axial motion therebetween, a load carrier supported on said nut members adapted to be connected to a load, yoke elements symmetrically spaced around said nut members pivotally connected to said load carrier, each yoke element being pivotally connected to both of said nut members with equal spacing between the pivot of each yoke element on said load carrier and the pivots of the respective yokes on said nut members.

5. In a device of the character described a screw, a pair of nuts threaded on said screw whereby relative rotation between said screw and nuts produces relative axial motion therebetween, a load carrier radially supported on said nuts adapted to be connected to a load, said carrier having projections symmetrically spaced around said screw, a yoke pivotally mounted on each of said projections, and pivot means connecting each of said yokes to each of said nuts and points equally spaced from the pivotal connection of the respective yoke on the corresponding projection.

6. In a device of the character described a screw, a pair of nuts threaded on said screw whereby relative rotation between said screw and nuts produces relative axial motion therebetween, a load carrier radially supported on said nuts adapted to be connected to a load, said carrier being formed with projections symmetrically spaced around said screw, a yoke pivotally mounted on each of said projections, said yokes being formed with inwardly projecting end portions positioned within recesses formed in said nuts whereby each yoke is pivotally connected to both of said nuts at points spaced from the pivotal mounting of the respective yoke on said projections.

7. In a device of the character described a screw formed with a helical groove, at least two nuts on said screw each formed with a helical groove which cooperates with said screw groove to form a helical passage in each nut, antifriction bearing elements in each passage interconnecting each nut to said screw whereby relative rotation between said screw and nuts produce relative axial motion therebetween, return means on each nut connecting the ends of said passage to form a closed circuit of bearing elements in each nut, and load means adapted to connect said nuts to a load in a manner wherein the load is divided between the nuts.

8. In a device of the character described a screw formed with a helical groove, at least two nuts on said screw each formed with a helical groove which cooperates with said screw groove to form a helical passage in each nut, anti-friction bearing elements in each passage interconnecting each nut to said screw whereby relative rotation between said screw and nuts produce relative axial motion therebetween, return means on each nut connecting the ends of said passage to form a closed circuit of bearing elements in each nut, the number of turns of bearing elements around said screw in each circuit being no greater than two and one-half, a load member adapted to be connected to a load, and means connecting said nuts and load member dividing the load therebetween in a predetermined manner.

9. In a device of the character described a screw formed with a helical groove, a pair of nuts on said screw each formed with a helical groove which cooperates with said screw groove to form a helical passage in each nut, anti-friction bearing elements in each passage interconnecting each nut to said screw whereby relative rotation between said screw and nuts produce relative axial motion therebetween, return means on each nut connecting the ends of said passage to form a closed circuit of bearing elements in each nut, the number of turns of bearing elements around said screw in each circuit being no greater than two and one-half, a load member adapted to be connected to a load, and means connecting said nuts and load member equally dividing the load therebetween.

10. In a device of the character described a screw and nut assembly adapted to support a predetermined load, said assembly including a plurality of nuts, said screw being formed with a helical groove, each nut being formed with a helical groove which cooperates with said screw groove to form a helical passage in each nut, return means on each nut connecting the ends of the cooperating passage to form therewith a closed circuit, antifriction bearings filling each circuit interconnecting said screw and nuts, the load carrying capacity of the bearings in each circuit being less than said predetermined load and the combined load carrying capacity of said bearings exceeding said predetermined load, a load carrier, and means operably connecting said load carrier to each nut dividing the load equally therebetween regardless of the amount of load applied to said load carrier.

No references cited.